(12) United States Patent
Stuber et al.

(10) Patent No.: US 7,174,401 B2
(45) Date of Patent: Feb. 6, 2007

(54) LOOK AHEAD SPLIT RELEASE FOR A DATA BUS

(75) Inventors: Russell B. Stuber, Boulder, CO (US); Robert W. Moss, Longmont, CO (US)

(73) Assignee: LSI Logic Corporation, Milpitas, CA (US)

( * ) Notice: Subject to any disclaimer, the term of this patent is extended or adjusted under 35 U.S.C. 154(b) by 778 days.

(21) Appl. No.: 10/086,786

(22) Filed: Feb. 28, 2002

(65) Prior Publication Data

US 2004/0267992 A1 Dec. 30, 2004

(51) Int. Cl.
*G06F 13/00* (2006.01)

(52) U.S. Cl. ............... 710/110; 710/113; 710/118; 710/240

(58) Field of Classification Search ........... 710/110, 710/113, 116, 108, 305, 240, 118, 309–311
See application file for complete search history.

(56) References Cited

U.S. PATENT DOCUMENTS

| | | | | |
|---|---|---|---|---|
| 4,620,278 A | * | 10/1986 | Ellsworth et al. | 710/119 |
| 5,058,006 A | * | 10/1991 | Durdan et al. | 711/122 |
| 5,257,356 A | * | 10/1993 | Brockmann et al. | 710/110 |
| 5,345,562 A | * | 9/1994 | Chen | 710/110 |
| 5,524,263 A | | 6/1996 | Griffth et al. | |
| 5,535,340 A | | 7/1996 | Bell et al. | |
| 5,557,759 A | * | 9/1996 | Crump et al. | 709/219 |
| 5,574,868 A | * | 11/1996 | Marisetty | 710/118 |
| 5,579,492 A | | 11/1996 | Gay | |
| 5,621,897 A | * | 4/1997 | Boury et al. | 710/116 |
| 5,845,097 A | | 12/1998 | Kang et al. | |
| 5,850,530 A | * | 12/1998 | Chen et al. | 710/113 |
| 5,884,052 A | * | 3/1999 | Chambers et al. | 710/107 |
| 5,931,924 A | | 8/1999 | Arimilli et al. | |
| 5,943,483 A | | 8/1999 | Solomon | |
| 5,944,805 A | | 8/1999 | Ricks et al. | |
| 5,961,621 A | * | 10/1999 | Wu et al. | 710/107 |
| 5,964,867 A | * | 10/1999 | Anderson et al. | 712/219 |
| 5,996,036 A | | 11/1999 | Kelly | |
| 6,052,763 A | | 4/2000 | Maruyama | |
| 6,075,929 A | * | 6/2000 | MacLaren | 710/311 |

(Continued)

FOREIGN PATENT DOCUMENTS

EP 720099 A1 7/1996

(Continued)

OTHER PUBLICATIONS

Morris Mano, "Computer System Architecture", 1982, Prentice-Hall, Inc., 2nd Ed., pp. 277280 and 428-434.*

(Continued)

*Primary Examiner*—Khanh Dang
(74) *Attorney, Agent, or Firm*—Westman, Champlin & Kelly

(57) ABSTRACT

A data bus transfers data between at least one slave device and a plurality of master devices, and an arbiter grants access to each of the master devices. The slave device includes look-ahead apparatus that includes staging register for staging an identification of a master device and a decoder for comparing a staged identification to an identification of a command from the bus. The look-ahead apparatus issues split releases of a next master device while the slave device returns data associated with a prior command.

8 Claims, 4 Drawing Sheets

U.S. PATENT DOCUMENTS

| | | |
|---|---|---|
| 6,076,125 A | 6/2000 | Anand |
| 6,092,141 A | 7/2000 | Lange |
| 6,141,715 A | 10/2000 | Porterfield |
| 6,154,800 A | 11/2000 | Anand |
| 6,216,190 B1 | 4/2001 | Chin et al. |
| 6,247,084 B1 * | 6/2001 | Apostol et al. ............. 710/108 |
| 6,256,694 B1 * | 7/2001 | Fenwick et al. ............ 710/107 |
| 6,397,279 B1 | 5/2002 | Jaramillo et al. |
| 6,442,642 B1 | 8/2002 | Brooks |
| 6,493,776 B1 * | 12/2002 | Courtright et al. .......... 710/110 |
| 6,577,165 B1 | 6/2003 | Cheung |
| 6,587,905 B1 | 7/2003 | Correale et al. |
| 6,598,104 B1 | 7/2003 | Jaramillo et al. |
| 6,604,159 B1 * | 8/2003 | Thekkath et al. ........... 710/110 |
| 6,633,944 B1 | 10/2003 | Holm et al. |
| 6,681,283 B1 | 1/2004 | Thekkath et al. |
| RE38,428 E | 2/2004 | Kelly et al. |
| 6,697,904 B1 | 2/2004 | Bennett |
| 6,732,208 B1 | 5/2004 | Alsaadi et al. |
| 6,750,870 B2 * | 6/2004 | Olarig ....................... 345/531 |
| 6,772,254 B2 | 8/2004 | Hofmann et al. |
| 6,910,087 B2 * | 6/2005 | Stuber et al. ................ 710/110 |
| 6,938,113 B2 * | 8/2005 | Stuber et al. ................ 710/110 |
| 6,948,019 B2 * | 9/2005 | Stuber et al. ................ 710/240 |
| 7,007,122 B2 * | 2/2006 | Solomon et al. ............ 710/240 |
| 2002/0062414 A1 | 5/2002 | Hoffmann et al. |
| 2002/0147871 A1 | 10/2002 | Tsuneo |
| 2003/0065844 A1 | 4/2003 | Lester et al. |
| 2003/0065847 A1 | 4/2003 | Goodrum et al. |
| 2004/0114454 A1 | 6/2004 | Farmwald st al. |

FOREIGN PATENT DOCUMENTS

| | | |
|---|---|---|
| EP | 737924 A2 | 10/1996 |
| WO | WO 963175 A2 | 11/1996 |

OTHER PUBLICATIONS

"Method to improve performance of split-read transactions," Oct. 1, 2000, IBM Technical Disclosure Bulletin, Issue 438, p. 1871.

"AMBA™ Specification (Rev. 2.0)", ARM Limited, Cambridge, England, pp. ii-vi and 3-1-3-58 (May 13, 1999).

* cited by examiner

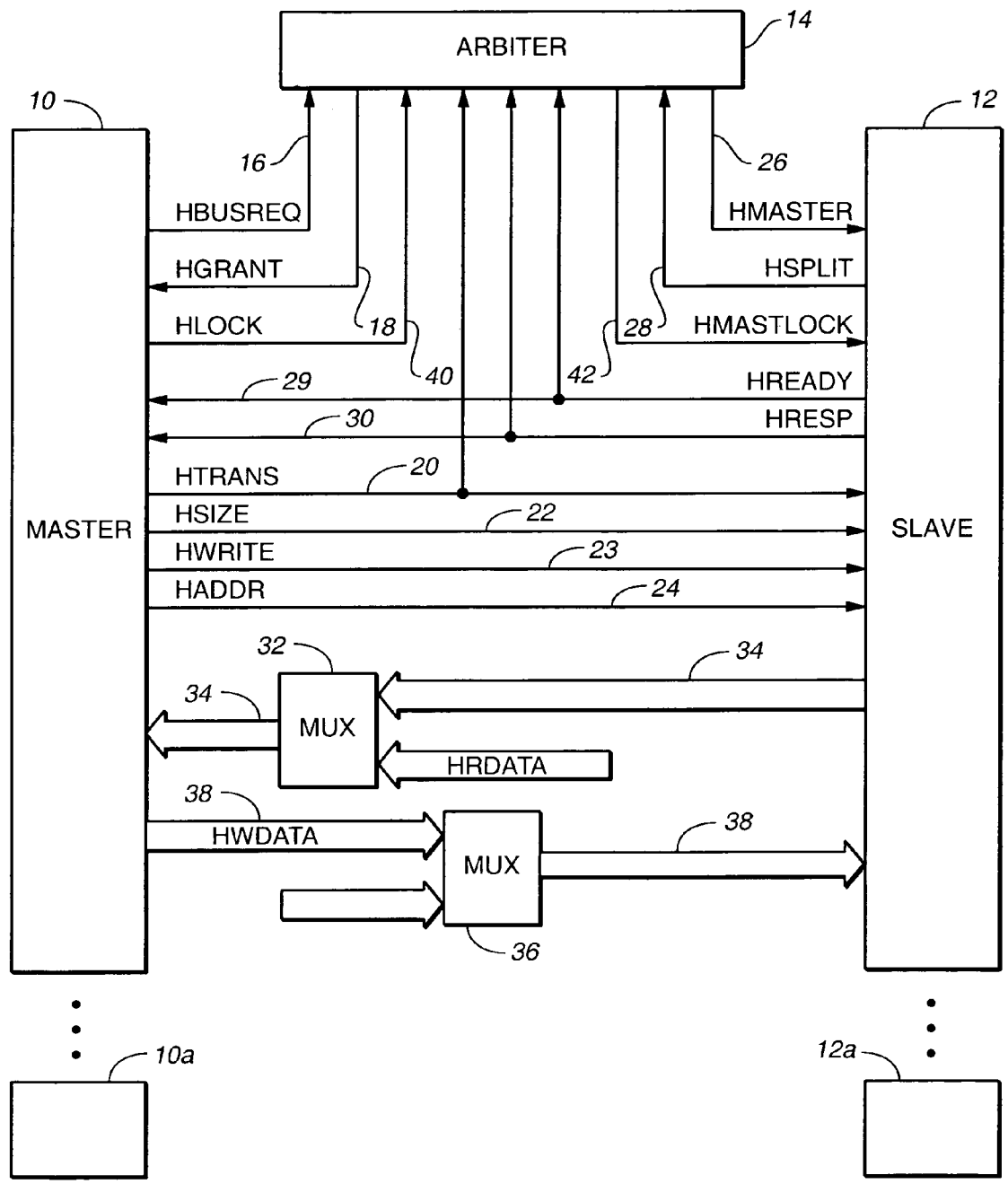
FIG._1

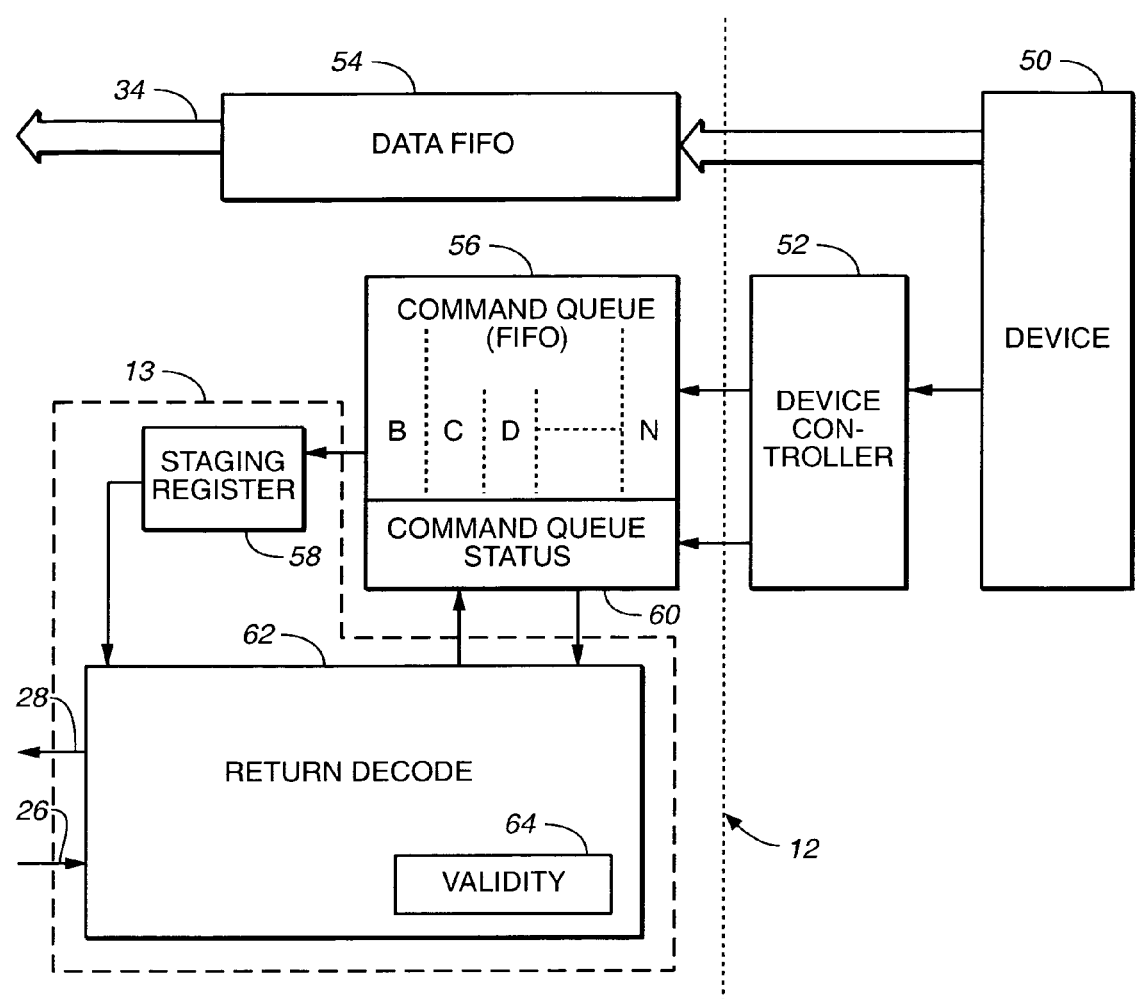
FIG._2

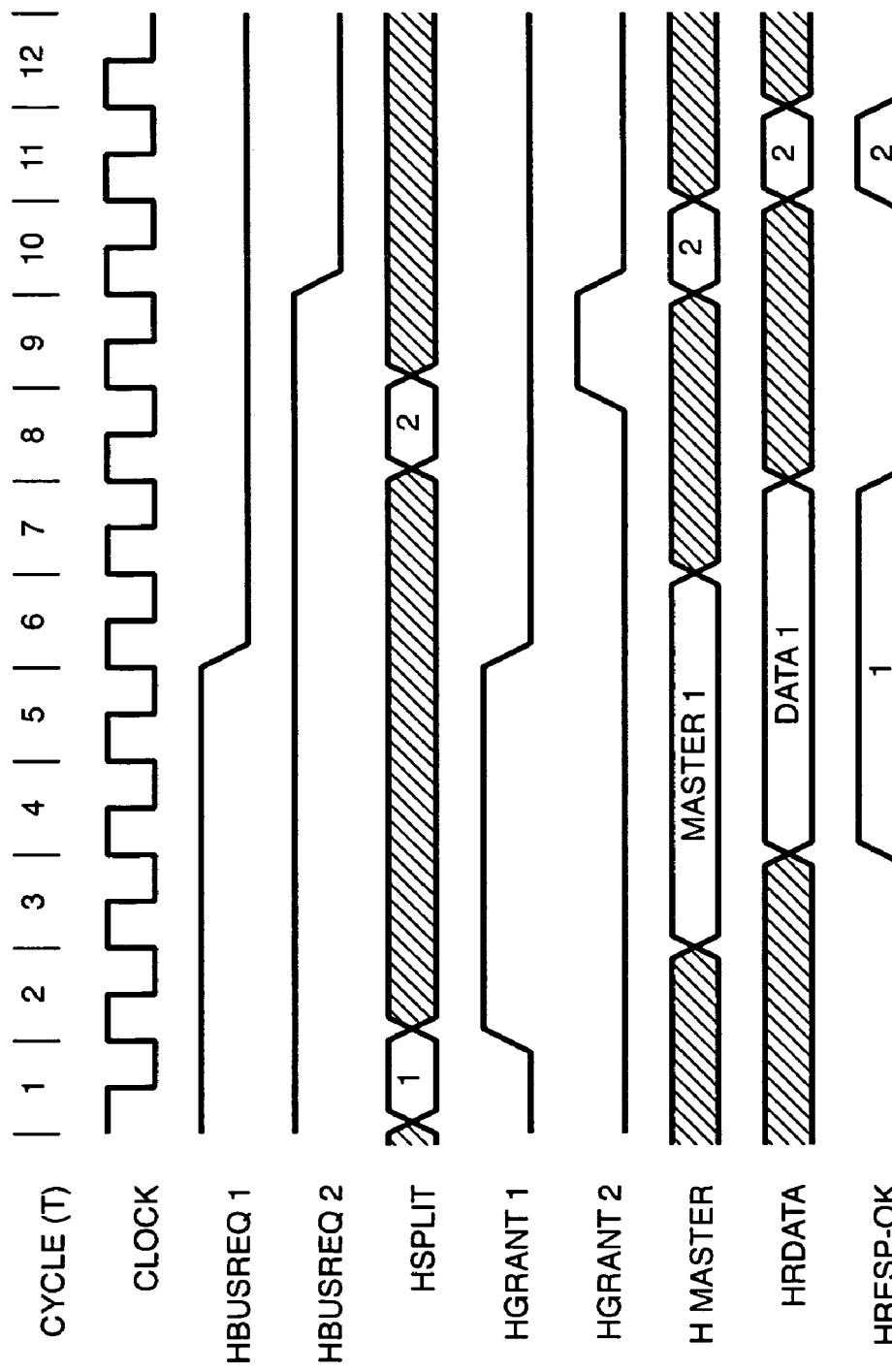
FIG._3 (PRIOR ART)

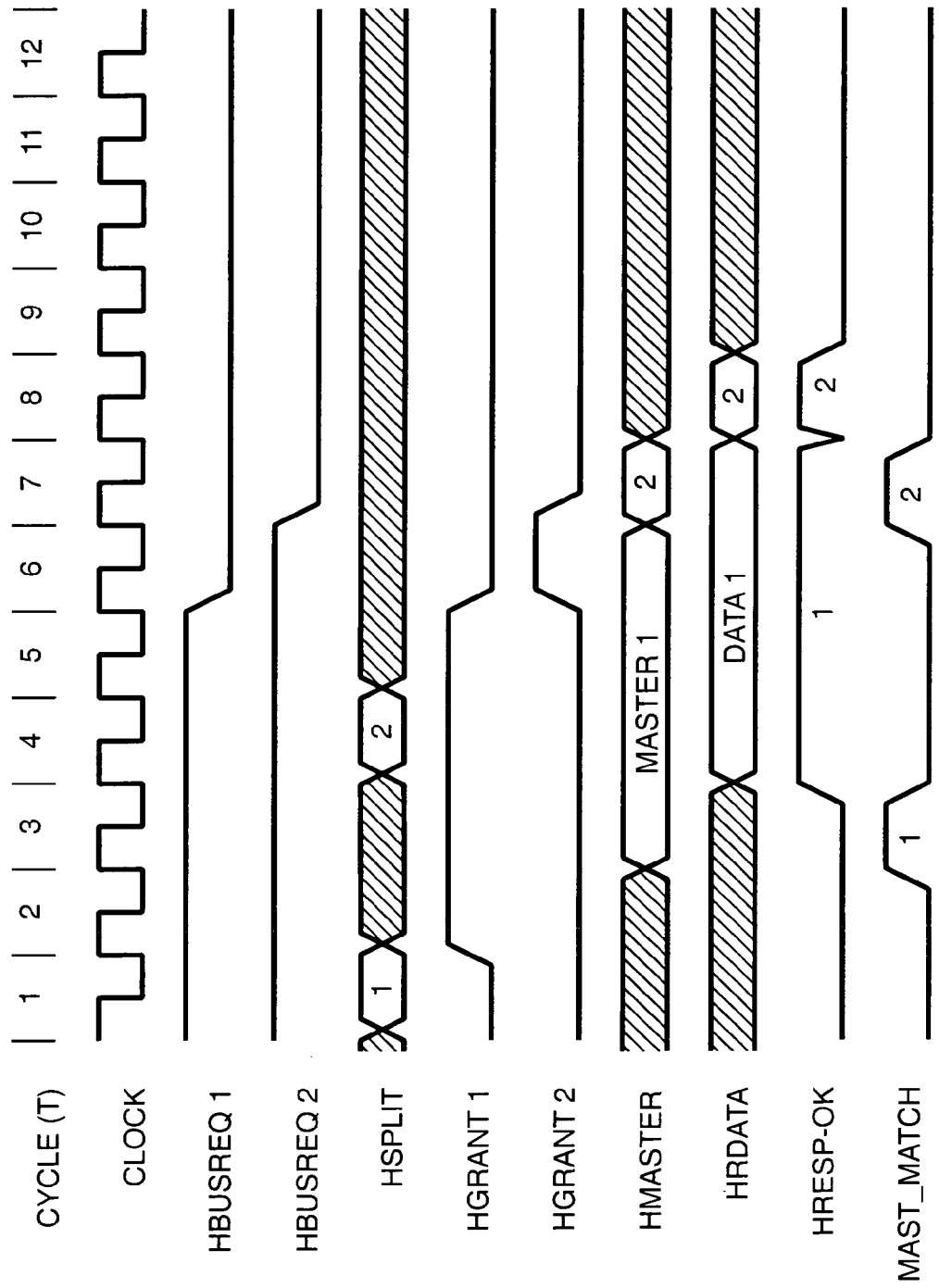
FIG._4

LOOK AHEAD SPLIT RELEASE FOR A DATA BUS

FIELD OF THE INVENTION

This invention relates to data buses, and particularly to controls for data buses used in integrated circuit chips and the like.

BACKGROUND OF THE INVENTION

Data buses are used in integrated circuits (ICs) to transfer data between master devices, such as user-controlled microprocessors, and slave devices that control peripheral devices, such as a memory or the like. To avoid overlapping data messages that may lead to error in data transmission between the master and slave devices, it is common to employ an arbiter to arbitrate message traffic on the bus. One such bus design is an Advanced High-performance Bus (AHB) from ARM Limited of Cambridge, England. The AHB bus design is a form of an Advanced Microcontroller Bus Architecture (AMBA) bus. The AHB bus provides high performance, high clock frequency data transfer between multiple bus master devices and multiple bus slave devices through use of an arbiter. The AHB bus is particularly useful in integrated circuit chips, including single chip processors, to couple processors to on-chip memories and to off-chip external memory interfaces.

Many bus designs, including the AHB bus, employ a split technique that is initiated when a slave device identifies that a command from a master device might not be serviced by the slave device within some prescribed criterion. For example, retrieval of data in response to a read command might require several bus cycles to complete before the slave device is ready to transfer the data to the requesting master device. Rather than hold the bus in a busy state while the slave device readies the data, the slave device may issue a split, blocking the requesting master device from the bus and idling the bus for use by other master devices. When the slave device becomes ready to accept commands, it removes the block from the originally requesting master device so that the arbiter may re-arbitrate that master device's request in accordance with the arbiter's protocol (along with all other requests that may be then existing) to eventually grant the re-arbitrated master device access to the bus. For example, where the slave device issued the split while it retrieves data from an external memory, when the data are retrieved and ready for transfer, the slave device removes the block from the requesting master device so that upon re-arbitration and re-grant to that master device, the master device re-issues its command to the slave device to complete the transfer.

Another example of the use of splits occurs where the slave device has queued several commands it is unable to service within a prescribed criterion. In this case, when the slave device that issued plural splits becomes ready to accept commands, it releases at least one of the split master devices so the arbiter may thereafter re-arbitrate that master device. However, the release of the split is issued in response to the transfer of the last beat of data for the command being executed. Consequently, valuable time can be lost as the split master device is first unblocked and the arbiter then re-arbitrates the priority.

SUMMARY OF THE INVENTION

The present invention is directed to a look-ahead technique whereby the slave device can initiate re-arbitration of split master devices while servicing a prior command from another master device. Consequently, the time required to unblock the split master device so that the arbiter may commence re-arbitration is not lost.

In one embodiment of the invention, the identification of the next master device in the return command queue is staged in a staging register of a look-ahead apparatus. The apparatus releases the split of that master device. When the command from that master device is received, indicating that the master device has use of the data bus, the identification of the next master device is staged in the staging register and the split of that master device is released. Consequently, the slave device can be transferring data with the first master device while releasing the split and allowing re-arbitration of the next master device.

BRIEF DESCRIPTION OF THE DRAWINGS

FIG. 1 is a block diagram of portions of a bus, illustrating a split control according to the present invention.

FIG. 2 is a functional block diagram of the output portion of a slave device for use in the bus illustrated in FIG. 1.

FIGS. 3 and 4 are timing diagrams of servicing previously-split master devices illustrating the advantages of the present invention, FIG. 3 being a timing diagram of a prior AHB bus and FIG. 4 being a timing diagram of a bus in accordance with the present invention.

DETAILED DESCRIPTION OF THE PREFERRED EMBODIMENTS

FIG. 1 illustrates portions of an Advanced High-performance Bus (AHB) design of an Advanced Microcontroller Bus Architecture (AMBA) bus from ARM Limited of Cambridge, England containing features of the present invention. A more detailed description of the AHB bus design may be found in *AMBA Specification* published by ARM Limited of Cambridge, England (1999), and particularly Chapter 3 thereof (pp. 3-1 to 3-58), incorporated herein by reference. This bus provides high performance, high clock frequency transfer between multiple bus master devices 10, 10a, etc. and multiple bus slave devices 12, 12a, etc., and is particularly useful in microprocessor chips, including single chip processors.

A master device 10 is a device that is capable of initiating a data transfer with a slave device 12 by providing address and control information. Examples of operations requiring data transfer between master and slave devices include read and write operations to read data from, or write data to, a peripheral memory device operated by the slave device. A slave device 12 is a device that responds to a command to perform the data transfer. The slave device ordinarily provides a return indicating the success, failure or waiting status of the data transfer.

In the bus illustrated in FIG. 1, data transfer operations between the master and slave devices are arbitrated by an arbiter 14, which is a device that ensures that only one master device 10 is allowed to initiate data transfers at a given time. The arbiter operates in accordance with an arbitration protocol that establishes a priority among the master devices, such as by an assigned rank or an allocation scheme based on usage.

One feature of the bus illustrated in FIG. 1 is the ability of certain slave devices 12 to initiate a split of a transfer request from a master device 10. More particularly, when a slave device is not ready to respond to the master device command, it may issue a stall or a split. A stall will hold the bus for the transaction with the master device so that no other traffic is permitted. A split will block the master device from the bus and idle the bus so that it becomes available to other master devices. Thus, a stall holds the bus busy, whereas a split releases the bus for use by other master devices. Splits are issued in response to implementation-specific conditions, such as where the slave device decides that the transfer will require a large number of cycles to complete or where the slave device is unable to process multiple transfer requests concurrently.

If the slave device issues a split, the requesting master device is blocked from use of the bus and the bus is idled for use by other master devices. When the slave device becomes ready to handle a request from a master device, it releases the splits so that the previously-split master device can be granted access to the bus.

Split transfers improve the overall utilization of the bus by separating, or splitting, the operation of the master device 10 providing the address to a slave device 12 from the operation of the slave device. Thus, with a split operation, the slave device can delay a master device from access to the bus until the slave device is ready to respond to the command.

A split initiated by slave device 12 causes arbiter 14 to mask off the master device 10 which issued the command from access to the bus. The split also idles the bus for use by other master devices. When slave device 12 is ready to handle the master device request, notifies the arbiter that it is ready and the arbiter unmasks the affected master device 10 so the arbiter can grant the master device access to the bus in accordance with the arbitration protocol of the arbiter. Upon re-arbitration and re-grant, the master device re-issues the split command to the slave device.

In operation of the data bus system shown in FIG. 1, arbiter 14 is configured to receive an HBUSREQ signal via an individual line 16 from a respective master device 10, indicating that the respective master device 10 seeks access to the data bus. Arbiter 14 responds to the requests in an order established by its protocol, as modified by any split or retry operation, to issue an HGRANT signal via a respective line 18 to one of the requesting master devices. If, for example, there are sixteen master devices, there will be sixteen lines 16 on which each respective master device 10 notifies arbiter 14 that the respective master device desires use of the bus and there will be sixteen lines 18 on which access is granted. The arbiter protocol grants access to one and only one master device at a time.

When access is granted to a master device 10, the address phase commences with the requesting master device 10 sending each slave device 12 an HTRANS signal via bus 20, an HSIZE signal via bus 22, an HWRITE signal via bus 23 and an HADDR signal via bus 24. The HTRANS signal is also sent to arbiter 14. In addition, the master device sends an HLOCK signal to the arbiter. The HWRITE signal is a single bit representing whether the master device is requesting a read or a write operation; the HSIZE signal is a 3-bit code representing the size of the transfer; the HADDR signal is a 32-bit code representing the address of the location in a slave device where data are to be read or written; the HTRANS signal is a 2-bit code identifying the type of transfer (e.g., sequential, non-sequential, idle or busy); and the HLOCK signal is a bit indicating whether or not the master is performing a series of indivisible (locked) transactions.

Arbiter 14 asserts a master identification code, or tag, via bus 26 identifying the master device that is using the bus. This tag is sent to all of the slave devices via bus 26. In the case of a system with sixteen master devices, the master identification code is a 4-bit code representing the individual master device. Arbiter 14 also asserts an HMASTLOCK bit indicating that the transfer is or is not part of a locked transaction.

Each master transaction (HTRANS) on bus 20 generates a response from one of the slave devices 12, namely the slave device containing the address where the data are to be read or written. The response appears on buses 29 and 30 as a 1-bit HREADY signal and a 2-bit HRESP signal. For purposes of the present invention, there are three responses that need to be considered (there are others as more fully described in the aforementioned AMBA Specification). An OKAY response occurs when HRESP is OKAY (HRESP=(0,0) and HREADY is asserted (HREADY=1). A STALL response occurs when HRESP is OKAY and HREADY is de-asserted (HRESP=(0,0) and HREADY=0). A SPLIT response is a two-cycle response that during the first cycle HRESP is SPLIT (HRESP=(1,1)) and HREADY is de-asserted (HREADY=0) and during the second cycle HRESP remains SPLIT and HREADY is asserted (HRESP=(1,1) and HREADY=1).

The OKAY response (HRESP=(0,0) and HREADY=1) indicates that the previous command has been completed, for example that the write command and data transfer was accepted by the slave device or that read data are available on the HRDATA bus 34. The STALL response (HRESP=(0,0) and HREADY=0) indicates that the slave device is not ready to provide a response. The slave device may hold HREADY low (HREADY=0) as long as it desires, but arbiter 14 cannot permit any bus traffic as long as HREADY is low, and the results of the prior transfer may not be known. The first cycle of the SPLIT response (HRESP=(1,1) and HREADY=0) masks off the master device from use of the bus, and the second cycle of the SPLIT response (HRESP=(1,1) and HREADY=1) idles the bus for use by other master devices.

Upon receipt of a command from a master device, the slave device records the bus master number in a master ID queue. If the slave device decides it will handle the transaction it issues an OKAY response on HRESP bus 30. If the command is a write command, or if it is a read command and the read data are available on HRDATA bus 34, the slave device also asserts a bit on the HREADY bus 29 (HREADY=1) and the transaction is completed. Otherwise, the slave device de-asserts the HREADY bus 30 (HREADY=0) to STALL the bus. When read data become available on HRDATA bus 34, slave device 12 asserts a bit on HREADY bus 29 and the transaction is completed.

If the slave device decides it is not ready to handle the transaction, it issues a SPLIT response on HREADY bus 30 and HRESP bus 29 to mask the master device from the bus and idle the bus. Later, when the slave device becomes free to accept a command, it asserts a bit on HSPLIT bus 28 to unmask the split master device. More particularly, bus 28 comprises the same number of lines as there are master devices 10, with one line dedicated for each master device. When slave device 12 is ready to accept a command, it asserts a bit on the HSPLIT line 28 corresponding to that master device(s) 10 whom the slave device is ready to handle, thereby unmasking that master device so that it may access the bus. Arbiter 14 eventually re-arbitrates the previously masked master devices in accordance with its protocol. On re-arbitration, the master device will eventually be granted access to the bus to re-issue the command and retry the transfer.

The basic stages of a split transaction of a read operation are as follows:

1. The master device 10 starts the transfer in an identical way to any other transfer and issues address and control information.
2. If the slave device 12 is able to provide data immediately it may do so. If the slave device decides that it may take a number of cycles to obtain the data or otherwise honor the command, it may give a split response via buses 29 and 30. During every transfer arbiter 14 broadcasts a number, or tag, showing which master device 10 is using the bus. The slave device 12 that can perform the command records the number, to use it to restart the transfer at a later time.
3. The arbiter masks off the split master device and arbitrates the other master devices for use of the bus. The action of the split response allows bus master device handover to occur.
4. When the slave device 12 is ready to complete the transfer, it asserts a bit on the appropriate line of HSPLIT bus 28 to the arbiter 14 to indicate which master device 10 should be re-arbitrated access to the bus.
5. When the bit is asserted on HSPLIT bus 28, arbiter 14 restores the priority of that master device.
6. Eventually, the arbiter will grant the master device use of the bus so it can re-issue the command and re-attempt the transfer. This may not occur immediately if a higher priority master is using the bus.
7. When the transfer eventually takes place, the slave finishes with an OKAY response (HRESP=(0,0) and HREADY=1) via buses 29 and 30.

As shown in FIG. 1, actual transfer of data is performed directly between the slave device 12 and master device 10. A read transfer occurs when the slave device receives the master identification tag via bus 26 for the master device 10 for which it has retrieved data. At that time, the correct master device 10 has been granted access to the bus and the transfer takes place through multiplexer 32 on bus 34 to the correct master device. During the transfer, the slave device 12 issues an OKAY response on buses 29 and 30 notifying the arbiter and master device that the transfer has successfully occurred.

In some cases, the master device 10 may assert an HLOCK signal on bus 40 to indicate to arbiter 14 that the master device is performing several indivisible transfers and that the arbiter must not grant any other master device access to the bus once the locked transfer commences. The arbiter indicates that a current transfer is part of a locked sequence by asserting an HMASTLOCK signal on bus 42 to slave device 12. The slave device responds to the signal on bus 42 to process all locked transfers before any other master device is granted access to the bus.

The problem to which the present invention is directed is that in the prior AHB bus, where a slave device 12 has issued multiple splits, the slave device does not issue the HSPLIT signal to unmask the next split master device until the slave device has completed its data transfer for the prior command. Consequently, the next split master device must wait until the slave device has completed data transfer for the prior command and issues the HSPLIT signal for that split master device. The next split master device is then re-arbitrated. If the slave device 12 received data for transfer to the next split master device, time can be lost as the slave device issues the HSPLIT signal at the last beat of data transfer for the prior command and the arbiter re-arbitrates access to the bus. The present invention permits the slave device to look ahead and unmask the next split master device to permit its re-arbitration while data are returned in response to the prior command.

FIG. 2 is a functional block diagram of the read command return portion of a slave device 12 containing a split command look-ahead apparatus 13 in accordance with the present invention. Slave device 12 is associated with a peripheral device 50, such as an external memory, and its associated device controller 52. FIFO 54 is a first-in, first out (FIFO) data register receives data returned from the peripheral device 50 for transfer to the requesting master device via bus 34. Device controller 52 returns the command to the read return portion of the slave device. The returned command includes the master ID in the form that appears on line 26 (i.e., HMASTER). The master ID is returned to a return register in the form of a command queue FIFO 56 at the same time that the last beat of data is returned to data FIFO 54.

In the prior AHB bus, the returned master ID caused an HSPLIT signal to appear on the line 28 corresponding to the master device of the returned master ID. Consequently, the HSPLIT signal was not issued until data were transferred to the master device issuing the prior command. In accordance with the present invention, the returned master IDs are queued in return command FIFO 56 on a first-in, first-out (FIFO) basis and issued to staging register 58. Consequently FIFO 56 contains the master IDs of commands whose data have been returned to FIFO 54. The split is released for the master device identified in the staging register.

FIFO 56 includes a command queue status counter 60, which maintains a count of commands in FIFO 52. The count in counter 60 is incremented with each master ID returned from device controller 52.

Return decoder 62 is a control device, which is responsive to the master ID in register 58 and to a HMASTER code on line 26 from arbiter 14 to indicate a match. If the code in register 58 matches the HMASTER code on line 26, decoder 62 provides a MAST_MATCH signal to FIFO 56 causing FIFO 56 to issue the next command master ID to register 58 and to decrement the count in counter 60.

Return decoder 62 includes a single-bit validity register 64 that identifies the validity of the command master ID in register 58. The validity bit is set when a master ID is written into staging register 58 from FIFO 56 and is reset (invalidated) when a match is found by decoder 62 between the HMASTER code on line 26 and the master ID code in register 58. FIFO 56 operates to insert the next master ID into staging register 58 whenever the validity bit indicates an invalid master ID in the staging register (e.g., the validity bit is low). If no command master ID is present in FIFO 56 (i.e., if FIFO 56 is empty), the validity bit remains low.

The return of an HMASTER code on line 26 that matches the master ID code in register 58 signifies that the master device identified in register 58 has been re-arbitrated and has re-issued the command to the slave device to commence transfer of data from data FIFO 54. Consequently the staging register validity bit is reset (invalidated). If there is at least one master ID in FIFO 56 (counter 60 indicating that FIFO 56 is not empty), staging register 58 is filled with the next master ID and an HSPLIT signal is imposed on the corresponding line 28 to unmask the corresponding master device and permit re-arbitration at the next bus cycle.

For example, assume that a master ID for master device A is in staging register 58 and has been submitted for re-arbitration, that command queue 56 contains commands that include master IDs for master devices B and C, and that an HSPLIT signal has been sent to unmask master device A that issued command A. At this point, the state of the validity bit in register 64 is high. When the HMASTER signal identifying master device A is returned with the reissued command A, decoder 62 identifies a match to the master ID in register 58 (MAST_MATCH high) and resets (invalidates) the validity bit. Data transfer from data FIFO 54 will commence for master device A when MAST_MATCH goes high. The state of the validity bit in register 64 is reset to low. With the validity bit low, the master ID for master device B is transferred to staging register 58, causing decoder 62 to issue an HSPLIT signal to master device B. Hence, re-arbitration of the next master device B is accomplished while data are transferred with master device A. The transfer of the master ID for master device B to staging register 58 validates the contents of register 58 (validity bit high) so that when the HMASTER signal for master device B is received on line 26, the comparison may again be made by decode 62 and the arbitration process may be repeated for master device C.

The count in counter 60 decrements with each master ID transferred to staging register 58. When master ID for master device C is transferred to staging register, the count in counter 60 is decremented to 0 (assuming no further master IDs are returned to FIFO 56 from device controller 52). Validity register 64 maintains the validity bit low when the count in counter 62 is 0 so that staging register 58 is not filled and no further HSPLIT signals are issued to re-arbitrate master devices.

FIGS. 3 and 4 identify the advantages of the present invention. FIG. 3 is a timing diagram of the illustrating servicing of previously-split commands in the prior AHB bus; FIG. 4 is a similar diagram for a bus employing the split look-ahead technique of the present invention. In both cases, it is assumed that the commands and data for both master devices 1 and 2 have returned and that both had been split. The split for master device 1 is released (HSPLIT high) at clock cycle T=1, master device 1 is granted use of the bus at T=2, the master ID (HMASTER) for master device 1 is returned on line 26 at T=3 and data transfer for master device 1 commences at T=4. In both cases, the data package (HRDATA) being returned to master device 1 is four beats, so the last beat of data is returned at T=7. It is further assumed that the HRESP signal is OKAY for each returned beat.

In the prior AHB bus, the return of the last beat of data at T=7 caused the slave device to issue the HSPLIT signal to release the split on master device 2 (at T=8). As a result, master device 2 was granted access to the bus at T=9, send its HMASTER signal at T=10 and data transfer to master device 2 commenced at T=11. (In this example, it is assumed that a single beat of data is destined for master device 2.)

Under the same circumstances, the present invention provides data transfer in fewer cycles, as illustrated in FIG. 4. More particularly, upon receipt of the HMASTER signal for master device 1 at time T=3, decoder 62 (FIG. 2) identifies a match (MAST_MATCH) between the received HMASTER signal and the master ID in staging register 58 corresponding to master device 1. The MAST_MATCH signal causes an HSPLIT signal to be issued for master device 2 and invalidates the MAST_MATCH (at T=4). Meanwhile, since master device 1 has use of the bus, the four beats of data are transferred from the data FIFO 54 to master device 1. As the last beat of data for master device 1 transfers (T=7), arbiter 14 grants use of the bus to master device 2, and issues the HMASTER signal for master device 2. The MAST_MATCH signal is high due to the comparison by decoder 62, and data transfer to master device 2 commences at T=8. Thus, instead of commencing data transfer to master device 2 at T=11 as in the prior AHB bus, data transfer commences three cycles earlier at T=8.

The advantages of the present invention are even more dramatic if additional commands and data are queued in the slave device. For example, if a command had also been returned for another master device (e.g., master device 3) and if the data package for master device 2 had been four beats (instead of a single beat as illustrated in the Figures), in the prior AHB bus the last beat of data for master device 2 would have been at T=14 and the HSPLIT signal for master device 3 would issue at T=16, meaning data could not begin transferring to master device 3 until T=18 (at the earliest). Under the same circumstances with the present invention, the last beat of data for master device 2 occurs at T=10 and the HSPLIT signal for master device 3 would issue at T=8. Consequently, data transfer for master device 3 would commence at T=11, immediately following data transfer for master device 2, seven beats earlier than in the prior AHB bus.

The present invention thus provides a look-ahead technique whereby the master identification associated with the next command of the command queue is submitted for re-arbitration while data transfer is being performed for the immediately previous command. The process requires only that the command queue not be empty, and that the master device for the immediately previous command has been arbitrated. The staging register is filled only if the prior master device has been arbitrated and the command queue has at least one command. Consequently, re-arbitration of the master device issuing the next command can commence while data are being transferred in response to the prior command.

One feature of the present invention, particularly as it applies to the AHB bus, the invention can be implemented with minimal additional hardware in slave devices capable of issuing splits and without any changes to existing controls and commands within the bus, arbiter and master devices. Instead, the additional decoder and staging register serve as a split release look ahead apparatus that issues HSPLIT signals to the arbiter in response to the HMASTER signal of the prior command.

Although the present invention has been described with reference to preferred embodiments, workers skilled in the art will recognize that changes may be made in form and detail without departing from the spirit and scope of the invention.

What is claimed is:

1. Look-ahead split release apparatus for a slave device coupled to a data bus for transferring data between the slave device and a plurality of master devices, the slave device including a return command register for storing identifications on a first-in, first-out order of split master devices for which data are returned, the apparatus comprising:

a staging register coupled to the return command register for storing an identification of a master device whose identification is highest in order in the return command register; and a control device responsive to a command from the master device whose identification is stored in the staging register and to the identification in the staging register to release a split of the master device that is next highest in the return command register.

2. Apparatus according to claim 1, wherein the control device compares an identification in the command from the master device to the identification in the staging register and releases a split of that master device if the identifications match.

3. Apparatus according to claim 2, wherein the control device includes a validation register containing a representation of the validity of the identification in the staging register, the control device being responsive to the representation that the identification in the staging register is invalid to transfer the next-ordered identification from the return command register to the staging register, to validate the next-ordered identification transferred to the staging register in the validation register and to release the split of the corresponding master device.

4. Apparatus according to claim 3, wherein the control device is further responsive to a command from the corresponding master device to invalidate the next-ordered identification transferred to the staging register.

5. Apparatus according to claim 3, wherein the return command register includes a counter providing an indication of whether the return command register is empty, the validation register being responsive to the indication that the return command register is empty to inhibit validation of an identification in the staging register.

6. Apparatus according to claim 1, wherein the control device includes a validation register containing a representation of the validity of an identification in the staging register, the control device being responsive to the representation that the identification in the staging register is invalid to transfer the next-ordered identification from the return command register to the staging register, validate the next-ordered identification transferred to the staging register in the validation register and release the split for the corresponding master device.

7. Apparatus according to claim 6, wherein the control device is further responsive to a command from the corresponding master device to invalidate the next-ordered identification transferred to the staging register.

8. Apparatus according to claim 6, wherein the return command register includes a counter providing an indication of whether the return command register is empty, the validation register being responsive to the indication that the return command register is empty to inhibit validation of an identification in the staging register.

* * * * *